United States Patent
Wang et al.

(10) Patent No.: US 9,325,091 B2
(45) Date of Patent: Apr. 26, 2016

(54) ELECTRICAL CARD CONNECTOR WITH IMPROVED METALLIC COVER

(71) Applicant: FOXCONN INTERCONNECT TECHNOLOGY LIMITED, Grand Cayman (KY)

(72) Inventors: Yan Wang, Kunshan (CN); Ding-Bing Fan, Kunshan (CN); Jian-Fei Yu, Kunshan (CN); Ji-Chao Wang, Kunshan (CN); Guo-Hua Zhang, Kunshan (CN); Qi-Sheng Zheng, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/534,050

(22) Filed: Nov. 5, 2014

(65) Prior Publication Data

US 2015/0126072 A1    May 7, 2015

(30) Foreign Application Priority Data

Nov. 5, 2013    (CN) .................. 2013 2 0691197 U

(51) Int. Cl.
| | |
|---|---|
| *H01R 24/00* | (2011.01) |
| *H01R 12/71* | (2011.01) |
| *H01R 13/24* | (2006.01) |
| *G06K 7/00* | (2006.01) |

(52) U.S. Cl.
CPC .............. *H01R 12/714* (2013.01); *G06K 7/003* (2013.01); *H01R 13/2442* (2013.01)

(58) Field of Classification Search
CPC ........... H01R 13/62938; H01R 13/637; H01R 13/65802; G06K 13/08
USPC ..................... 439/157–159, 629–631, 607.01
See application file for complete search history.

(56) References Cited

U.S. PATENT DOCUMENTS

| | | | | |
|---|---|---|---|---|
| 6,811,443 | B2 * | 11/2004 | Machihara ....... | H01R 13/65802 439/607.01 |
| 6,840,807 | B2 * | 1/2005 | Ooya ................. | H01R 23/6873 439/607.01 |
| 6,851,959 | B2 * | 2/2005 | Ooya .................. | G06K 7/0021 439/159 |
| 7,011,533 | B2 * | 3/2006 | Miyamoto ....... | H01R 13/65802 439/108 |
| 7,244,130 | B2 * | 7/2007 | Miyamoto ........... | H01R 13/629 439/159 |
| 7,247,054 | B2 * | 7/2007 | Kuo ..................... | G06K 7/0034 439/607.01 |
| 7,371,089 | B2 * | 5/2008 | Cheng ................. | G06K 7/0013 439/159 |
| 7,384,294 | B2 * | 6/2008 | Washino ............. | G06K 7/0021 439/326 |
| 7,431,595 | B1 * | 10/2008 | Yen ..................... | G06K 7/0021 439/138 |
| 7,445,473 | B2 * | 11/2008 | Chen ..................... | G06F 1/185 439/138 |
| 7,658,649 | B2 * | 2/2010 | Satoh .................... | H01R 31/06 439/630 |

FOREIGN PATENT DOCUMENTS

CN            202585910         12/2012

\* cited by examiner

*Primary Examiner* — Thanh Tam Le
(74) *Attorney, Agent, or Firm* — Wei Te Chung; Ming Chieh Chang

(57) ABSTRACT

An electrical connector, for receiving an electrical card, includes an insulative housing, a plurality of conductive contacts retained in the insulative housing and a metallic shell covering the insulative housing. The metallic cover and the insulative housing define a receiving cavity. The shell has a top plate, the top plate is formed with a plurality of openings, a plurality of resisting pieces bent downwardly from front edges of the openings, and a plurality of gaps defined between each two adjacent resisting pieces. Each contact has a conductive portion extending into the receiving cavity, and the conductive portions and the gaps of the top plate are alternatively disposed.

19 Claims, 6 Drawing Sheets

ELECTRICAL CARD CONNECTOR WITH IMPROVED METALLIC COVER

BACKGROUND OF THE INVENTION

1. Field of the Invention

The present invention relates to electrical card connectors, more particularly to an electrical card connector with an improved metallic cover for preventing an aslant-inserted electrical card.

2. Description of Related Art

Chinese Patent CN 202585910, issued on Dec. 5, 2012, discloses an electrical card connector, which comprises an insulative housing, a plurality of contacts received in the insulative housing and a metallic cover covering the insulative housing. The metallic cover has a top wall upon a cavity defined by the insulative housing and the metallic cover for receiving an electrical card. The top wall is formed with a plurality of openings corresponding to contacting portions of the contacts and two elastic fingers besides the opening to press the inserted card. However, when the electrical card inserts, it is easy to incline and then brush the contacting portions of the contacts, and the contact may be destroyed after being used for a long time.

Hence, an improved electrical connector is desired to overcome the above problems.

BRIEF SUMMARY OF THE INVENTION

According to one aspect of the present invention, an electrical connector, for receiving an electrical card, comprises an insulative housing with a bottom wall, a metallic cover covering the insulative housing to define a receiving cavity, and a plurality of contacts retained to the insulative housing and extending into the receiving cavity. The shell has a top plate, which defines a plurality of openings, a plurality of resisting pieces bent downwardly from front edges of the openings, and a plurality of gaps defined between each two adjacent resisting pieces. Each contact has a conductive portion, and the conductive portions and the gaps of the top plate are alternatively disposed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
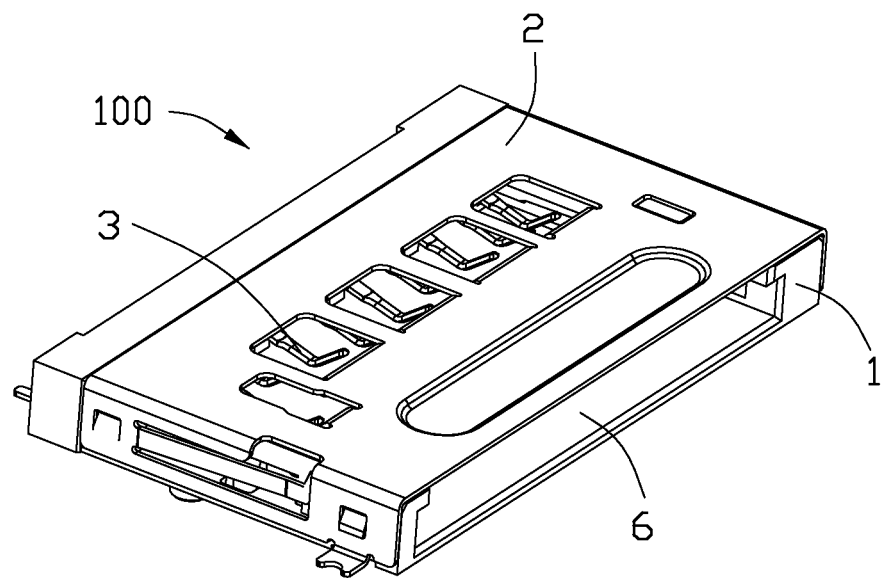
FIG. 1 is an assembled, perspective view of an electrical card connector according to the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 2:
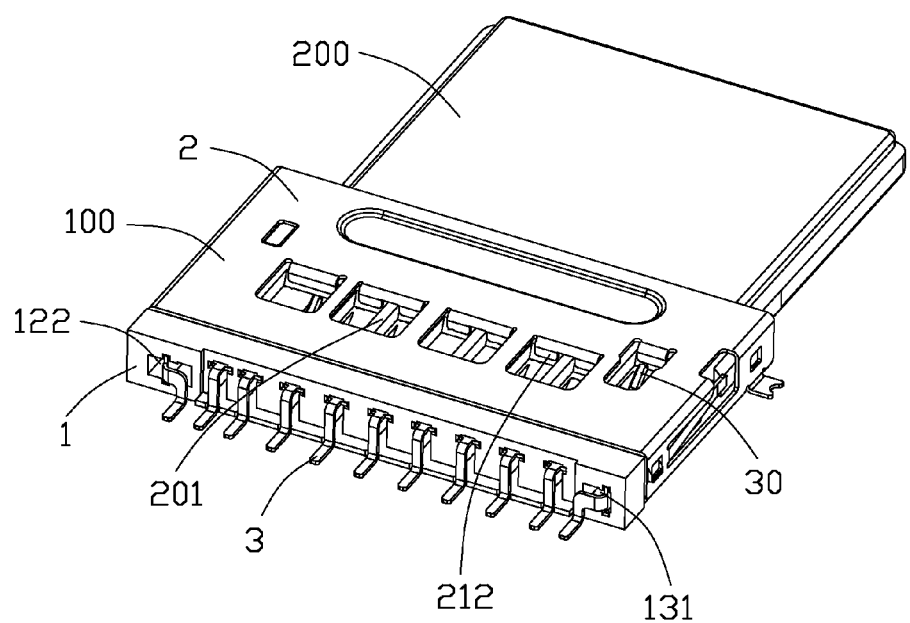
FIG. 2 is another perspective view of the electrical card connector with an electrical card.
Figure 3:
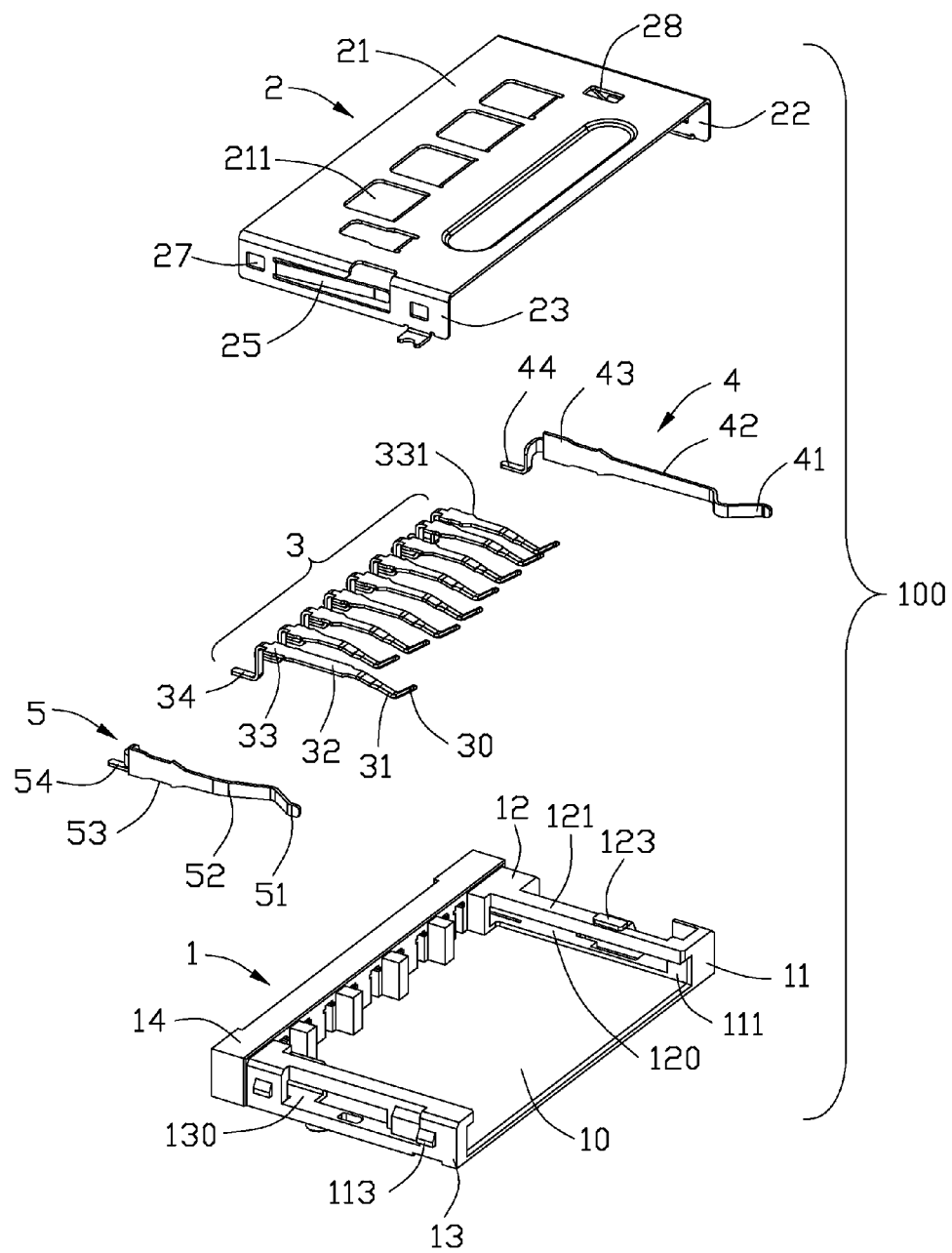
FIG. 3 is an explored, perspective view of the electrical card connector.

Referring to FIGS. 1-3, an electrical card connector 100 in accordance with present invention is used for mating with an electrical card 200. The electrical card connector 100 comprises an insulative housing 1, a plurality of conductive contacts 3 retained in the insulative housing 1, a metallic cover 2 covering on the insulative housing 1, a receiving cavity 6 defined between the metallic cover 2 and the insulative housing 1 and a first and a second detect pins 4, 5 mounted to the insulative housing 1.

Referring to FIGS. 2-5, the insulative housing 1 has a bottom wall 10 facing to the metallic cover 2, a first side wall 12 and a second side wall 13 extending upwardly from the left and the right sides thereof, and a mounting wall 14 linking the two side walls 12, 13 and the bottom wall 10. The first wall 12 has a slot 120 for accommodating the first detect pin 4, the slot 120 passes through the side wall 12 upwardly, and also passes through the mounting wall 14 rearward to define a first mounting hole 122. The insulative housing 1 further has a mating face 11 at the front end thereof. The side walls 12, 13 and the bottom wall 10 commonly define two guiding slots 110 besides the receiving cavity 6 for guiding an insertion of the electrical card 200.

The bottom wall of the guiding slot 110 is a part of the bottom wall 10 of the insulative housing 1. The guiding slot 110 further has a perpendicular inner side surface 111 connecting a top wall thereof and a bottom wall thereof, the slot 120 passes through the inner side surface 111 to communicate with the receiving cavity 6, and make a part of the top wall of the guiding slot 110 be a transverse arm 121 bestriding the guiding slot 110, the transverse arm 121 has a protrusion 123 on the top thereof to engage with the metallic cover 2. The transverse arm 121 has a resisting face 1211 on an outside vertical side and a clump 1210 protruding into the slot 120 from the resisting face 1211. The first side wall 12 and the second side wall 13 are formed with a plurality of latching ribs 113 for latching with the metallic cover 2. The latching ribs 113 are located on a front and a rear ends of the first side wall 12 and the second side wall 13.

Figure 4:
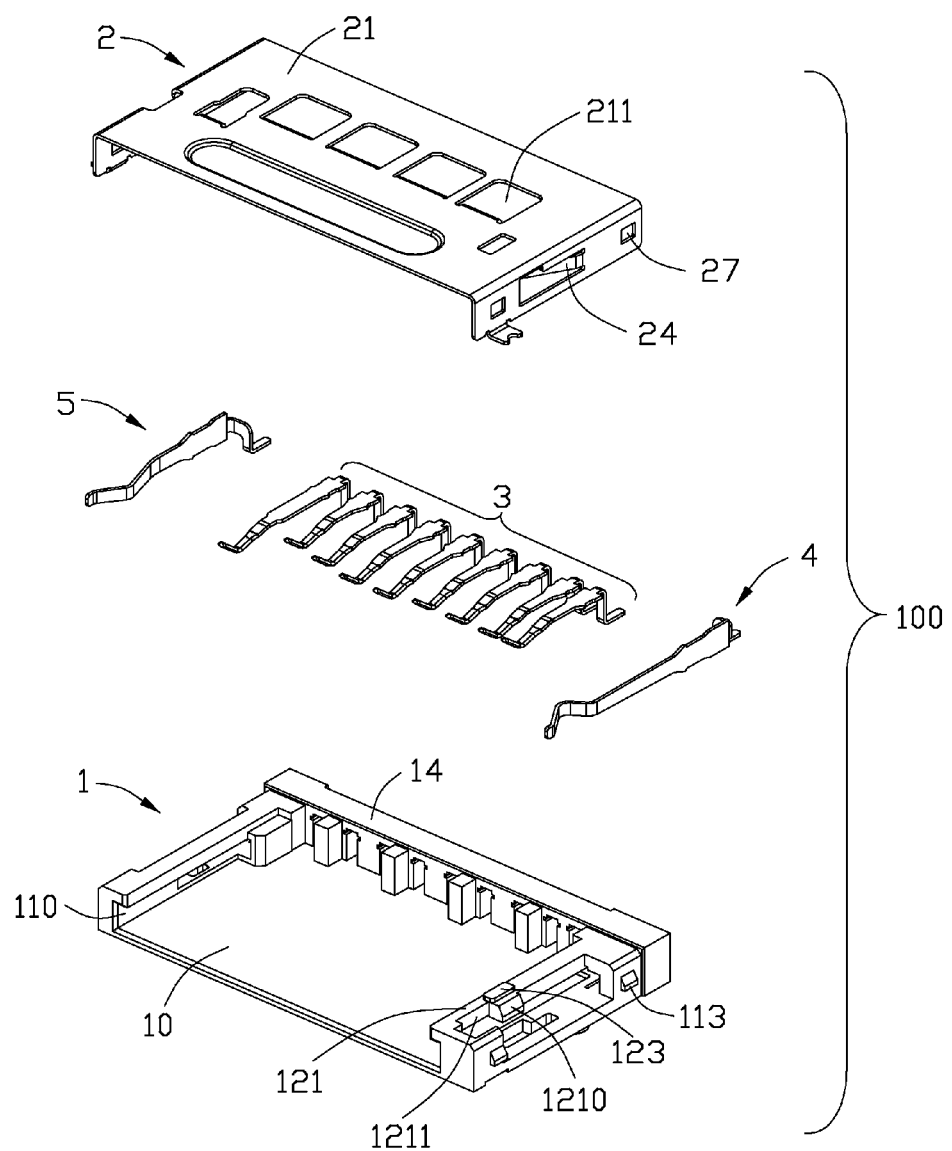
FIG. 4 is similar with FIG. 3.
Figure 5:
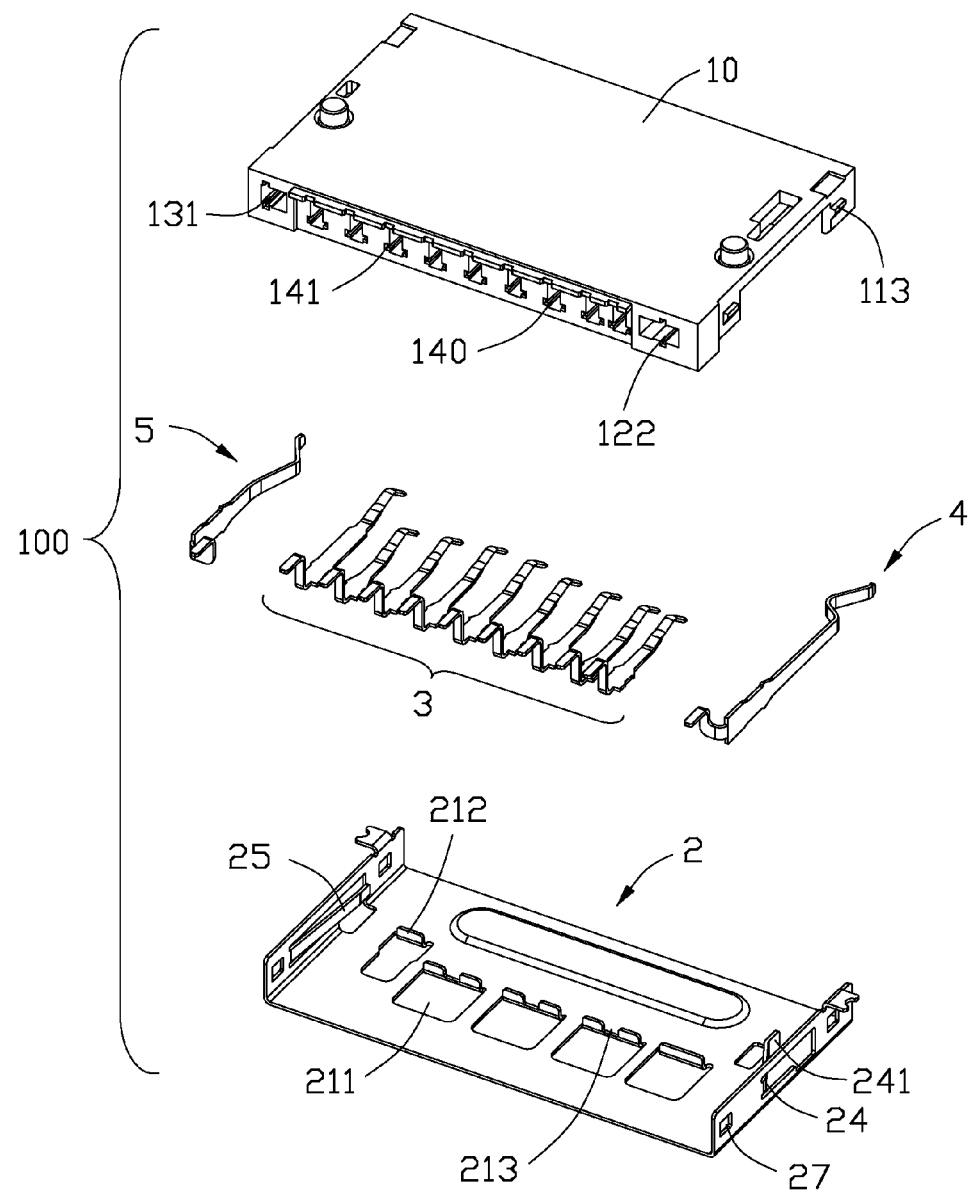
FIG. 5 is also similar with FIG. 3, and taken from another side.

Referring to FIGS. 3-5, the second side wall 13 has a groove 130 horizontally through the second side wall 13 for receiving the second detect pin 5, the groove 130 passes through the mounting wall 14 from a center part thereof to define a second mounting hole 131. The mounting wall 14 is formed with a row of passageways 140 and a plurality of retaining slots 141 above the passageways 140.

The conductive contact 3 has a fixing portion 33 mounted in the retaining slots 141, a soldering leg 34 extending from the fixing portion 33 and beyond the mounting wall 14, an extending portion 32 extending forwardly from the fixing portion 33 and an arch elastic conductive portion 31 extending forwardly from the extending portion 32 and protruding toward the bottom wall 10, the conductive portions 31 are arranged in a row along a width direction of the insulative housing 1 and substantially located on the upper side of the receiving cavity 6. The fixing portion 33 has a plurality of barbs 331 on two sides thereof to interferes with inner walls of the retaining slots 141.

The first detect pin 4 has a first mounting portion 43 perpendicular mounted in the first mounting hole 122, a first retaining portion 42 extending from the first mounting portion 43, an arch first elastic contacting portion 41 extending from the first retaining portion 42 to the receiving cavity 6, and a first soldering portion 44 extending rearward from the first mounting portion 43. The second detect pin 5 has a second mounting portion 53 perpendicular mounted in the second mounting hole 131, a second retaining portion 52 extending from the second mounting portion 53, an arch second elastic contacting portion 51 extending from the second retaining portion 52 to the receiving cavity 6, and a second soldering portion 54 extending rearward from the second mounting portion 53. The first soldering portion 44, the second soldering portion 54 and the soldering legs 34 of the conductive legs 3 are arranged in a same row and are coplanar with each other.

Referring to FIGS. 2-5, the metallic cover 2 has a top plate 21 covering the receiving cavity 6, a first sidewall 22 and a second sidewall 23 bent from two opposite sides of the top plate 21. The first sidewall 22 is torn to form a first elastic piece 24 from the middle thereof. The first elastic piece 24 has a cantilever arm 241 aslant extending into the slot 120 and resisting on the clump 1210 of the insulative housing 1 at a free end thereof, so the first elastic piece 24 is originally separated away from the first detect pin 4 before the electrical card 200 is inserted into the electrical card connector 100.

The second sidewall 23 is torn to form a second elastic piece 25 from the middle thereof. The first elastic arm 24 and the first detect pin 4 are used to indicate whether the electrical card 200 is in a write protecting status. The second elastic arm 25 and the second detect pin 5 are used to indicate whether the electrical card 200 is inserted into the electrical card connector 100. The top plate 21 has a through notch 28 to engage with the protrusion 123 of the transverse arm 121 to strengthen the transverse arm 121. The first sidewall 22 and the second sidewall 23 further have a plurality of latching openings 27 latching with the latching ribs 113 of the insulative housing 1.

The top plate 21 has a plurality of openings 211 and a plurality of resisting or aligning pieces 212 formed by tearing and extending from an edge of the opening 211 into the receiving cavity 6. The openings 211 are over corresponding conductive contacts 3, and the resisting pieces 212 are located above and in a front of the conductive contacts 3.

The resisting pieces 212 extend downwardly, and are lower than free ends 30 of the contacts 3 along a vertical direction, so that the electrical card 200 will not enter into a room between the free ends 30 and the resisting pieces 212 that may destroy the conductive contacts 3. There are some gaps 213 between two adjacent resisting pieces 212, and the gaps 213 and the conductive contacts 3 are alternately disposed along the width direction of the electrical card connector 100.

Figure 6:
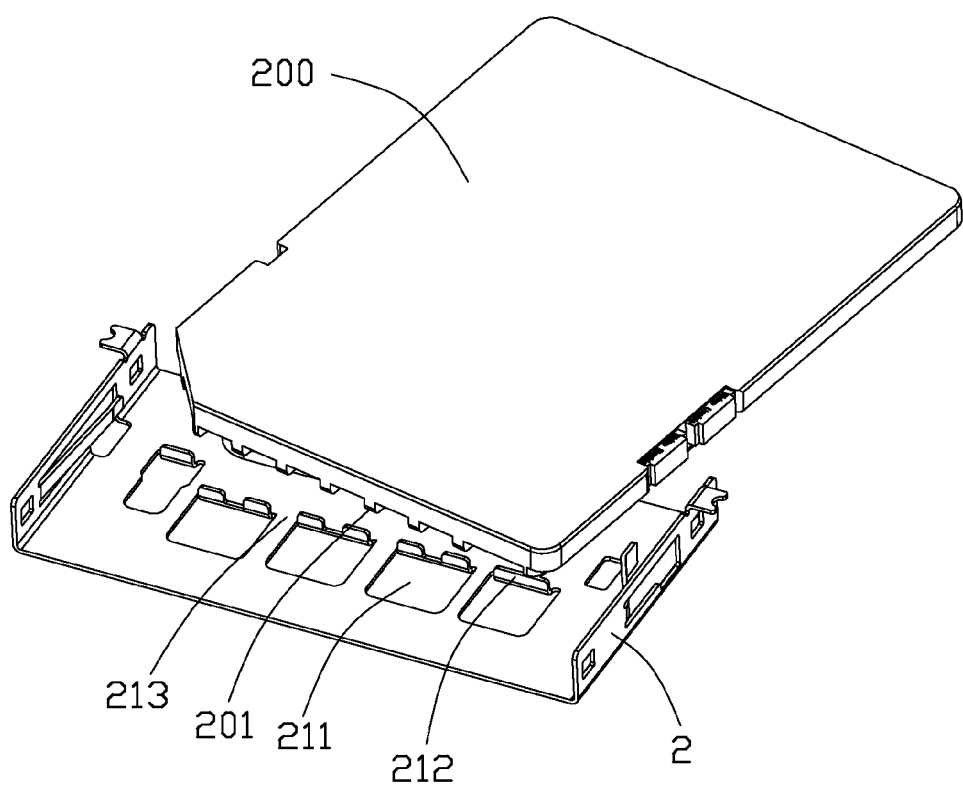
FIG. 6 shows an aslant inserted electrical card engaging with a metallic cover of the electrical card connector.

Referring to FIGS. 2 and 6, the electrical card 200 has a plurality of conductive pads and a plurality of fences 201 between two adjacent conductive pads. The gap 123 of the top plate 21 is wider than the fence 201 of the electrical card 200.

Referring to FIG. 6, when the electrical card 200 is inserted, the conductive portions 31 of the contacts 3 are pushed upwardly by the electrical card 200, the openings 211 allow the conductive portions 31 to escape so as to prevent the contacts 3 from touching the top plate 21. While the resisting pieces 212 are helpful to position the inserting electrical card 200. If the electrical card 200 is inserting into the electrical card connector 100 with an inclined station, the resisting pieces 212 will crash and block the fences 201 of the electrical card 200 and prevent the electrical card 200 from further inserting; while if the electrical card 200 is inserting into the electrical card connector 100 with a correct horizontal station, the fences 201 of the electrical card 200 will pass the resisting pieces 212 through the gaps 213 and will not be blocked by the resisting pieces 212.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical card connector, for receiving an electrical card, comprising:
    an insulative housing having a bottom wall;
    a metallic cover covering the insulative housing to define a receiving cavity, the cover having a top plate, the top plate formed with a plurality of openings, a plurality of resisting pieces bent downwardly from front edges of the openings, and each of a plurality of gaps defined between two adjacent resisting pieces; and
    a plurality of contacts retained to the insulative housing and extending into the receiving cavity, each contact having a conductive portion, and the conductive portions and the gaps of the top plate alternatively disposed; wherein
    the electrical card has a plurality of conductive pads for contacting with the conductive portions, each of a plurality of fences defined between two adjacent conductive pads, and the gap of the top plate is slightly and compliantly wider than the fence of the electrical card to receptively guide the fence to go therethrough so as to avoid tilting of insertion of the card.

2. The electrical connector as claimed in claim 1, wherein the resisting pieces are in a front of the conductive portion of the contacts.

3. The electrical connector as claimed in claim 2, wherein the resisting piece is lower than a free end of the conductive portion of the contact.

4. The electrical card connector as claimed in claim 2, wherein the openings of the top plate are over corresponding conductive portions of contacts.

5. The electrical card connector as claimed in claim 2, wherein the contact has a fixing portion mounted to the insulative housing, a soldering leg extending from the fixing portion and beyond the insulative housing, and an extending portion extending forwardly from the fixing portion, and the conductive portion extends forwardly from the extending portion and protrudes toward the bottom wall.

6. The electrical card connector as claimed in claim 5, wherein the conductive portions are arranged in a row along a width direction of the insulative housing and substantially located on the upper side of the receiving cavity.

7. The electrical card connector as claimed in claim 1, wherein the resisting pieces crashes and blocks the fences of the electrical card which is inserted in an inclined station.

8. An electrical card connector, for receiving an electrical card, comprising:
- an insulative housing;
- a plurality of contacts retained to the insulative housing, each contact having a conductive portion for contacting with the electrical card; and
- a metallic cover covering the insulative housing to define a receiving cavity together with the insulative housing, the metallic cover having a top plate, the top plate defining a plurality of openings which upwardly expose the conductive portions, a plurality of resisting pieces bent downwardly from front edges of the openings, each resisting pieces located in front of and aligned with a corresponding conductive portion along a front to back direction, and a gap defined between each two adjacent resisting pieces aligning with a space between two adjacent conductive portions; wherein the electrical card has a plurality of conductive pads for contacting with the conductive portions and each of a plurality of fences defined between two adjacent conductive pads, the gap of the top plate is wider than the fence of the electrical card for allowing the fence going through, when the electrical card is inserted in an inclined status, the resisting pieces crashes and blocks the fences.

9. The electrical connector as claimed in claim 8, wherein the resisting piece is lower than a free end of the conductive portion of the contact.

10. The electrical connector as claimed in claim 8, wherein the resisting pieces are in a front of the conductive portions of the contacts.

11. The electrical card connector as claimed in claim 10, wherein the contact has a fixing portion mounted to the insulative housing, a soldering leg extending from the fixing portion and beyond the insulative housing, and an extending portion extending forwardly from the fixing portion, the conductive portion extends forwardly from the extending portion and protrudes toward a bottom wall of the insulative housing.

12. The electrical card connector as claimed in claim 11, wherein the conductive portions are arranged in a row along a width direction of the insulative housing and substantially located on the upper side of the receiving cavity.

13. The electrical card connector as claimed in claim 8, wherein each of said resisting pieces lies in a plane extending a transverse direction perpendicular to said front-to-back direction.

14. An electrical connector assembly comprising:
- an insulative housing defining a card receiving space;
- a plurality of deflectable contacts disposed in the housing with contacting sections extending into the card receiving space in a deflectable manner in a vertical direction;
- a metallic shield attached to the housing to cover said card receiving space in the vertical direction to allow said card receiving space to communicate with an exterior in a front-to-back direction perpendicular to said vertical direction;
- a plurality of aligning pieces unitarily extending from the shield at least in the vertical direction;
- an electronic card adapted to be inserted into the card receiving space and including:
- a plurality of stationary contacts separated from one another via corresponding fences in a transverse direction perpendicular to both said front-to-back direction and said vertical direction; wherein
- during the electronic card being inserted into the card receiving space, each of said fences is snugly received between the corresponding pair of aligning pieces in the transverse direction to avoid tilting of the electronic card.

15. The electrical connector assembly as claimed in claim 14, wherein each of the fences further extends in said transverse direction.

16. The electrical connector assembly as claimed in claim 14, wherein the shield forms in the vertical direction a plurality of through openings aligned with the corresponding fences in the front-to-back direction.

17. The electrical connector assembly as claimed in claim 14, wherein said fences are not tilted with regard to the front-to-back direction, the vertical direction and the transverse direction.

18. The electrical connector assembly as claimed in claim 14, wherein the deflectable contacts are aligned with the corresponding aligning pieces in the front-to-back direction, respectively.

19. The electrical connector assembly as claimed in claim 18, wherein said aligning pieces are located in front of the corresponding deflectable contacts in the front-to-back direction, respectively.

* * * * *